(12) United States Patent  
Sen

(10) Patent No.: US 11,643,276 B1  
(45) Date of Patent: May 9, 2023

(54) DEPLOYABLE BULK MATERIAL DISTRIBUTION APPARATUS

(71) Applicant: Johnny Frederick Sen, Innisfree (CA)

(72) Inventor: Johnny Frederick Sen, Innisfree (CA)

( * ) Notice: Subject to any disclaimer, the term of this patent is extended or adjusted under 35 U.S.C. 154(b) by 36 days.

(21) Appl. No.: 17/550,411

(22) Filed: Dec. 14, 2021

(51) Int. Cl.
| | | |
|---|---|---|
| *B65G 41/02* | (2006.01) |
| *B65G 33/32* | (2006.01) |
| *B65G 37/00* | (2006.01) |
| *B65G 47/16* | (2006.01) |
| *B65G 65/46* | (2006.01) |
| *B65G 17/12* | (2006.01) |
| *B65G 41/00* | (2006.01) |
| *B65G 47/51* | (2006.01) |

(52) U.S. Cl.
CPC ......... *B65G 17/126* (2013.01); *B65G 41/008* (2013.01); *B65G 47/16* (2013.01); *B65G 47/5195* (2013.01); *B65G 65/46* (2013.01); *B65G 2201/04* (2013.01); *B65G 2814/0332* (2013.01)

(58) Field of Classification Search
CPC ...... B65G 17/126; B65G 33/32; B65G 37/00; B65G 41/008; B65G 41/02; B65G 47/16; B65G 47/5195; B65G 65/46; B65G 2201/04; B65G 2814/0332
USPC .............................................. 198/307.1, 312
See application file for complete search history.

(56) References Cited

U.S. PATENT DOCUMENTS

| | | | |
|---|---|---|---|
| 601,582 A | 3/1898 | Milton | |
| 638,954 A | 12/1899 | Carr | |
| 649,103 A | 5/1900 | Gleason | |
| 1,432,917 A | 10/1922 | Shaw | |
| 1,955,238 A | 4/1934 | Jones | |
| 3,014,575 A * | 12/1961 | Klein ..................... | B65G 33/32 198/659 |
| 3,170,560 A * | 2/1965 | Obmascher ............ | B65G 67/00 198/314 |
| 3,378,152 A * | 4/1968 | Warner .................. | B65G 47/18 414/350 |
| 3,542,299 A * | 11/1970 | Sholl ........................ | B22C 5/04 241/24.15 |
| 4,534,461 A * | 8/1985 | Silverthorn .......... | B65G 17/126 198/612 |

(Continued)

FOREIGN PATENT DOCUMENTS

| | | |
|---|---|---|
| CN | 205574875 U | 9/2016 |
| GB | 124900 A | 4/1919 |

*Primary Examiner* — Douglas A Hess  
(74) *Attorney, Agent, or Firm* — Stratford Group Ltd.

(57) ABSTRACT

A deployable bulk material distribution apparatus for discharging from a designated height an amount of a flowable bulk material into a discharge location is provided. In one embodiment, the apparatus comprises an auger section; a bucket elevator section configured so as to be movable between: an upright position; and a reclined position wherein the bucket elevator section is substantially reclined for transport; and a joint assembly coupling the exit aperture of the auger section to the boot inlet of the bucket elevator section so as to allow the flowable bulk material to move from the exit aperture to the boot inlet when the bucket elevator section is in the upright position, the joint assembly being rotatably coupled to the boot inlet. The auger section and container operable to freely move along the bucket elevator section when it is moved between the upright and reclined positions.

9 Claims, 3 Drawing Sheets

(56) References Cited

U.S. PATENT DOCUMENTS

| | | | |
|---|---|---|---|
| 4,958,721 A | | 9/1990 | Redford |
| 4,963,066 A | * | 10/1990 | Boppart ................. B65G 33/32 |
| | | | 198/674 |
| 7,191,889 B1 | * | 3/2007 | Heley .................... B65G 21/10 |
| | | | 198/315 |
| 7,424,943 B2 | * | 9/2008 | Gausman ............... B65G 67/24 |
| | | | 414/398 |
| 7,470,082 B2 | * | 12/2008 | Lloyd ................... E01C 23/065 |
| | | | 404/85 |
| 8,662,285 B2 | * | 3/2014 | Jesse .................... B65G 41/002 |
| | | | 198/300 |
| 8,820,515 B2 | * | 9/2014 | Houssian ............... A01D 57/00 |
| | | | 198/666 |
| 9,663,303 B2 | | 5/2017 | Waldner et al. |
| 10,239,713 B2 | * | 3/2019 | Elias ...................... B65G 67/24 |
| 10,414,319 B2 | * | 9/2019 | Friesen ..................... B60P 1/36 |
| 10,584,003 B2 | * | 3/2020 | Friesen ................. B65G 47/44 |
| 10,633,174 B2 | * | 4/2020 | Pham ..................... B65D 88/32 |
| 10,766,710 B2 | * | 9/2020 | Bacon-Maldonado, III ................ |
| | | | B65G 41/002 |
| 11,267,663 B2 | * | 3/2022 | Herman ............... B65G 41/008 |
| 11,332,321 B2 | * | 5/2022 | Bacon-Maldonado, III ................ |
| | | | B65G 41/002 |
| 11,447,348 B2 | * | 9/2022 | Heilskov ............... B65G 23/24 |
| 11,472,643 B1 | * | 10/2022 | Sen ....................... F26B 17/122 |
| 2016/0244268 A1 | | 8/2016 | Ritter |

* cited by examiner

DEPLOYABLE BULK MATERIAL DISTRIBUTION APPARATUS

FIELD OF THE INVENTION

The present disclosure relates to conveyors, more specifically, but not by way of limitation, more particularly to a deployable bulk material distribution apparatus.

BACKGROUND

Any discussion of the related art throughout the specification should in no way be considered as an admission that such related art is widely known or forms part of common general knowledge in the field.

During harvest season, distributing harvested grain to different storage locations can often be time consuming and require the use of different equipment such as bucket elevators or the like that are difficult to move or deploy.

U.S. Pub. No. 2016/0244268 A1 (Ritter) discloses a mobile material elevating system. The system includes an apparatus for elevating materials that is particularly useful in limited spaces and/or where flexibility in positioning is desirable. Fully self-contained, the apparatus is trailer mounted and provided with a hydraulic system for positioning and powering the individual components as needed to feed material from supply trucks to the apparatus and then to vertically elevate the material for distribution to desired locations as needed for such purposes as, for instance, delivering proppant to site storage for hydraulic fracturing of oil wells. The individual components, including a material-receiving feeder pan, inclined auger, rotatable tower mount, and bucket elevator are preferably trailer-mounted and the bucket elevator is selectively positionable from a first, position for operating and elevating materials to a second position for over-the-road transport. Shortcomings include a lack of joint assembly for rotatably coupling each of an auger and a bucket elevator with respect thereto, and a lack of compactness for using the elevator in tight spaces.

CN Pat. No. 205,574,875 U (Pei et al.) discloses a portable bucket elevator. Shortcomings include a lack of joint assembly for rotatably coupling each of an auger and a bucket elevator with respect thereto, and a lack of compactness for using the elevator in tight spaces.

GB Pat. No. 124,900 A (Nute) discloses improvements in elevators for grain and the like. In one embodiment, a bucket elevator for grain is supported by wheels at its lower end and at its upper end is pivotally mounted in flanged rollers running in guides in a frame which runs on rollers on a semicircular track fixed to the vehicle K. The pivot is connected by wires to the ends of chains which pass round sprockets actuated by a hand-wheel. The sprocket shaft is provided with a ratchet which is engaged by a pawl mounted on the frame. The rollers are actuated by the chain. When the elevator is raised clear of the ground for transport, it is steadied by the engagement of the hooked ends of the bars with the bar. A scraper and a guard Pare attached to the foot of the elevator. In use, the foot of the elevator moves forward automatically into the heap of material as the buckets remove it. Shortcomings include a lack of joint assembly for rotatably coupling each of an auger and a bucket elevator with respect thereto, and a lack of compactness for using the elevator in tight spaces.

U.S. Pat. No. 601,582 A (Milton) discloses a portable grain elevator. A body of the elevator is a hopper supported in a wheeled frame, adapted to be hauled from field to granary or wherever else an ordinary farm-wagon may go. Shortcomings include a lack of joint assembly for rotatably coupling each of an auger and a bucket elevator with respect thereto, and a lack of compactness for using the elevator in tight spaces.

U.S. Pat. No. 638,954 A (Carr) discloses a portable grain elevator. The portable elevator may be folded compactly upon the power mechanism to render the apparatus portable bodily from one place to another, and the foldable-elevator mechanism and the power mechanism for driving the operative elements thereof are combined together in such a manner that the elevator may be folded without disconnecting the power-transmitting appliances. Shortcomings include a lack of joint assembly for rotatably coupling each of an auger and a bucket elevator with respect thereto, and a lack of compactness for using the elevator in tight spaces.

U.S. Pat. No. 649,103 A (Gleason) discloses a portable grain elevator. In one embodiment, a series of buckets attached to an endless belt, mechanism for imparting motion to said buckets, a tower upon which the buckets and operating mechanism are supported, the tower consisting of a framework attached to a vertical supporting-plate, a grain bin, and hinges connecting the plate and grain bin. Shortcomings include a lack of joint assembly for rotatably coupling each of an auger and a bucket elevator with respect thereto, and a lack of compactness for using the elevator in tight spaces.

U.S. Pat. No. 1,432,917 A (Shaw) discloses a portable bucket conveyer. In one embodiment, the conveyer has a rigid frame including two parallel rectangular bottom bars, out-turned at their lower ends to provide a pair of feet upon which the conveyer rests when in the operative position. Shortcomings include a lack of joint assembly for rotatably coupling each of an auger and a bucket elevator with respect thereto, and a lack of compactness for using the elevator in tight spaces.

U.S. Pat. No. 1,955,238 A (Shaw) discloses a portable bucket elevator. The portable conveyor having a combination of a truck body including front and rear wheels, a vertically extending support mounted thereon, and a forwardly and downwardly inclined conveyor mounted on said support and pivoted thereto at a point substantially directly above the rear wheels of the truck body. Shortcomings include a lack of joint assembly for rotatably coupling each of an auger and a bucket elevator with respect thereto, and a lack of compactness for using the elevator in tight spaces.

U.S. Pat. No. 4,958,721 A (Redford) discloses an inclined bucket elevator. The bucket conveyor has a guide track, a plurality of independent buckets slidably engaged with the guide track and a driving mechanism that directly engages each bucket of the plurality of buckets during their movement around the guide track. The guide track is provided with a detachable segment which allows the removal of buckets from and the addition of buckets to the bucket elevator. Shortcomings include a lack of joint assembly for rotatably coupling each of an auger and a bucket elevator with respect thereto, and a lack of compactness for using the elevator in tight spaces.

U.S. Pat. No. 9,663,303 B2 (Waldner et al.) discloses a portable conveyor system with drive-over unloading ramp and a longitudinal conveyor feeding a bucket elevator. The portable conveyor system is configured for receiving particulate material from a transport vehicle and conveying the particulate material to an elevated location. A main conveyor features a bucket elevator carried on a wheeled transportable frame and movable between an operational position standing upright from the transportable frame and a storage position laid down along the transportable frame. A feeder conveyor connected to the transportable frame is operable to convey material from into an inlet of the bucket elevator that is situated adjacent a lower end the elevator's upright operational position. A drive-over assembly enables loading of the feeder conveyor from a bottom unload transport vehicle. The feeder conveyor and the drive-over assembly may be carried on a movable framework for movement of the feeder conveyor between a stowed position on the transportable frame, and a use position extending laterally outward to position the drive-over assembly beside the transportable frame. Shortcomings include a lack of joint assembly for rotatably coupling each of an auger and a bucket elevator with respect thereto, and a lack of compactness for using the elevator in tight spaces.

All documents cited herein are incorporated by reference.

BRIEF SUMMARY

It is an object of the invention to provide a deployable bulk material distribution apparatus.

In accordance with one aspect, there is provided a deployable bulk material distribution apparatus for discharging from a designated height an amount of a flowable bulk material into a discharge location, the apparatus comprising: a mobile container comprising two or more wheels and configured to receive the amount of flowable bulk material to be discharged therein; an auger section comprising an input aperture rotatably coupled to a side of the mobile container, the auger section being operable to move the flowable bulk material from the container to an exit aperture thereof; a bucket elevator section, the bucket elevator section being hingedly coupled to a displaceable support frame, and being configured so as to be pivotally movable between: an upright position for lifting at the designated height the flowable bulk material received from the exit aperture of the auger section via a boot inlet of the bucket elevator section and discharging the flowable bulk material at the discharge location from a discharge outlet thereof; and a reclined position wherein the bucket elevator section is substantially reclined for transport; and a joint assembly coupling the exit aperture of the auger section to the boot inlet of the bucket elevator section so as to allow the flowable bulk material to move from the exit aperture to the boot inlet when the bucket elevator section is in the upright position, the joint assembly being rotatably coupled to both the boot inlet of the bucket elevator section and the exit aperture of the auger section, wherein the input aperture and joint assembly are each operable to rotate so that the auger section and the container move freely along the bucket elevator section when the bucket elevator section is moved between the upright and reclined position without torsional stress being applied to the auger section and without the container being overturned; wherein the displaceable support frame comprises: at least two wheels; at least one retractable or foldable rigid support member coupled to the support frame at one end and an upper portion of the bucket elevator section at the other, the support member being operable to hold and move the bucket elevator section between the upright position and the reclined position; and an attachment means to removably attach the displaceable support frame to a motorized vehicle for transporting the apparatus when the bucket elevator section is in the reclined position to said discharge location.

In one embodiment, the bucket elevator section is pivotally coupled to the displaceable frame via one or more hinge rods.

In one embodiment, the joint assembly comprises: a coupling member, the coupling member being substantially L-shaped and comprising therein two joint apertures; a first joint configured to mechanically couple together the exit aperture of the auger section and one of said two joint apertures of the coupling member, the first joint being rotatably coupled to the coupling member so as to be rotatable with respect to a vertical axis of rotation centered thereon; a second joint coupled at one end to the input shoot of the bucket elevator section and rotatably coupled at a second end to the coupling member, the second end configured to be rotatable with respect to the coupling member along the horizontal axis of rotation centered thereon.

In one embodiment, the input aperture of the auger section is rotatably coupled to the side of the container via a ball joint allowing the auger section to pivot freely with respect to the input aperture along any axis of rotation.

In one embodiment, the apparatus further comprises a hydraulic drive coupled to both the auger section and the bucket elevator section and operable to drive the auger section and bucket elevator section simultaneously.

In one embodiment, the hydraulic drive is coupled to the bottom pulley of the bucket elevator section.

In one embodiment, the at least one retractable or collapsible support member comprises a middle portion configured to hingedly couple a top portion and bottom portion of the support member, the top portion of the at least one retractable or collapsible support member being affixed to the bucket elevator section; the bottom portion of the at least one retractable or collapsible support member having an end thereof rotatably coupled the displaceable support frame; and wherein the bucket elevator section is moved from the upright position to the reclined position or from the reclined position to the upright position by pivotally moving the bottom portion downwards or upwards, respectfully, with respect to the displaceable support frame, thereby folding or unfolding the top portion with respect to the bottom portion.

In one embodiment, an output chute of the bucket elevator section has coupled thereto a diverter operable to divide the flowable bulk material being discharged into two or more streams simultaneously.

In one embodiment, the distance between the container and discharge location is 40 feet in length or less.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In the figures, embodiments are illustrated by way of example. It is to be expressly understood that the description and figures are only for the purpose of illustration and as an aid to understanding.

Figure 1:
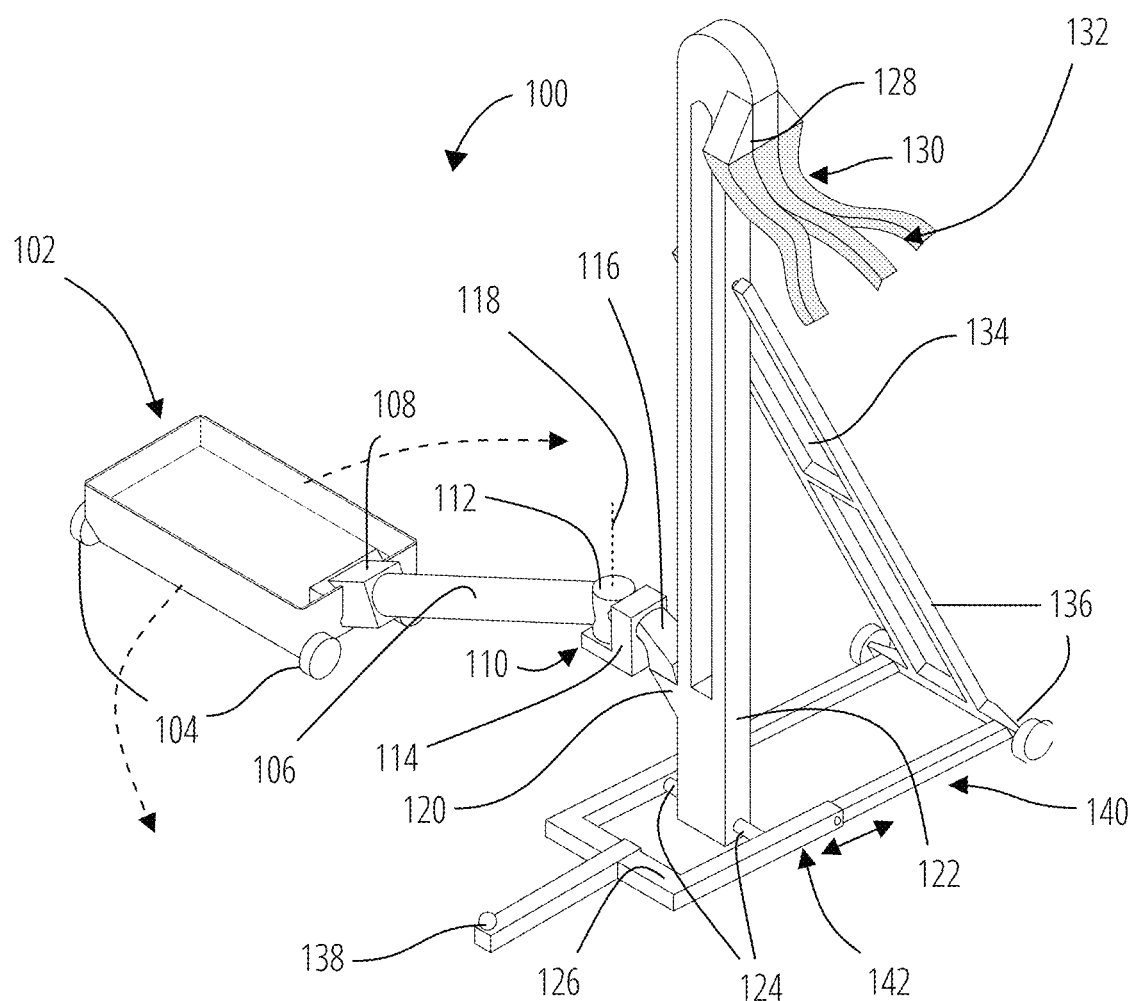

Embodiments will now be described, by way of example only, with reference to the attached figures, wherein the figures:

FIG. 1 is a perspective view of a movable bulk material distribution apparatus in its deployed configuration, in accordance with one embodiment.

Figure 2A:
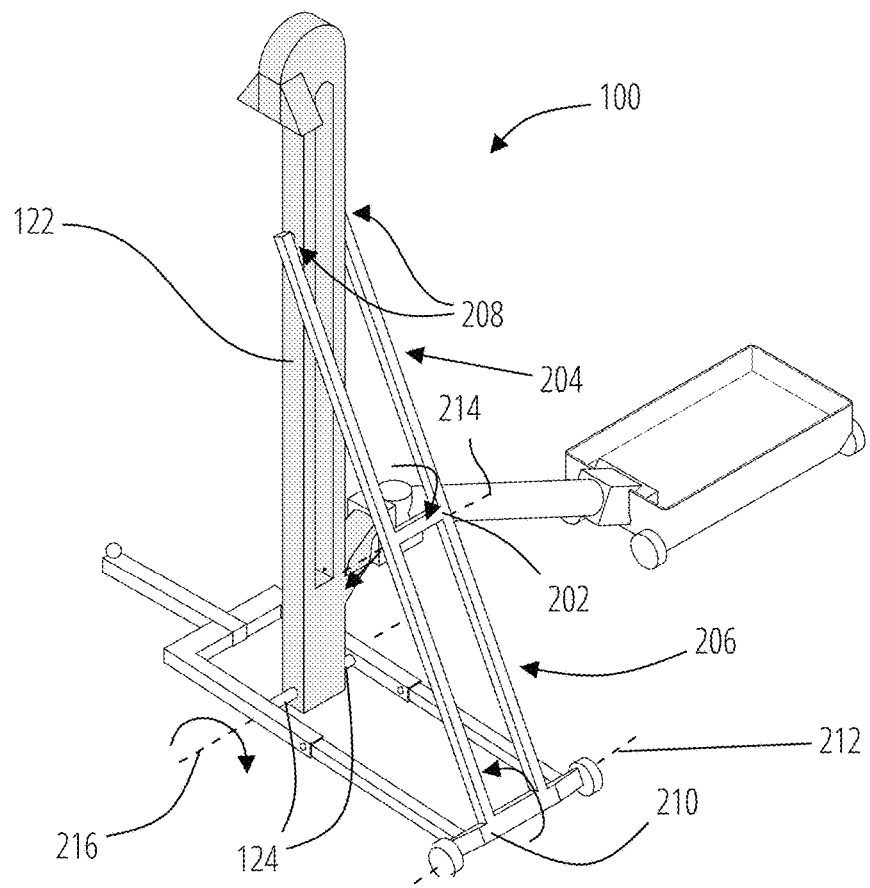
Figure 2B:
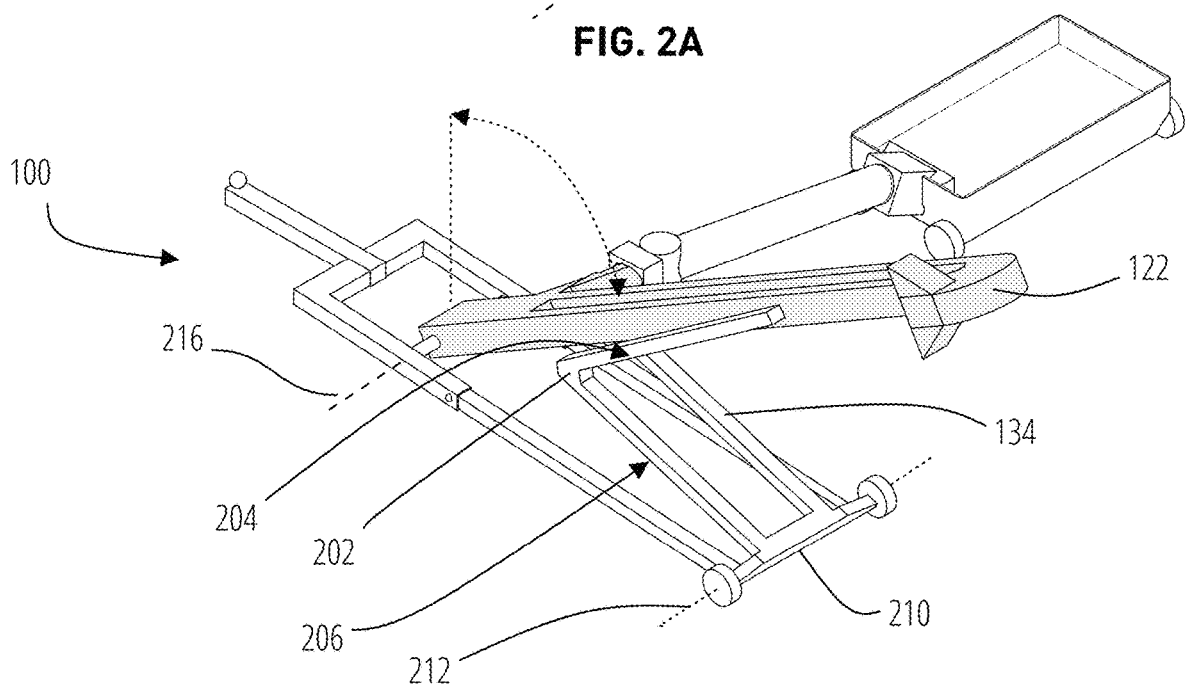

FIGS. 2A and 2B are additional perspective views of the deployable bulk material distribution apparatus of FIG. 1, in its deployed configuration (FIG. 2A) and in its (collapsed or folded or transportable) configuration (FIG. 2B), in accordance with one embodiment.

Figure 3:
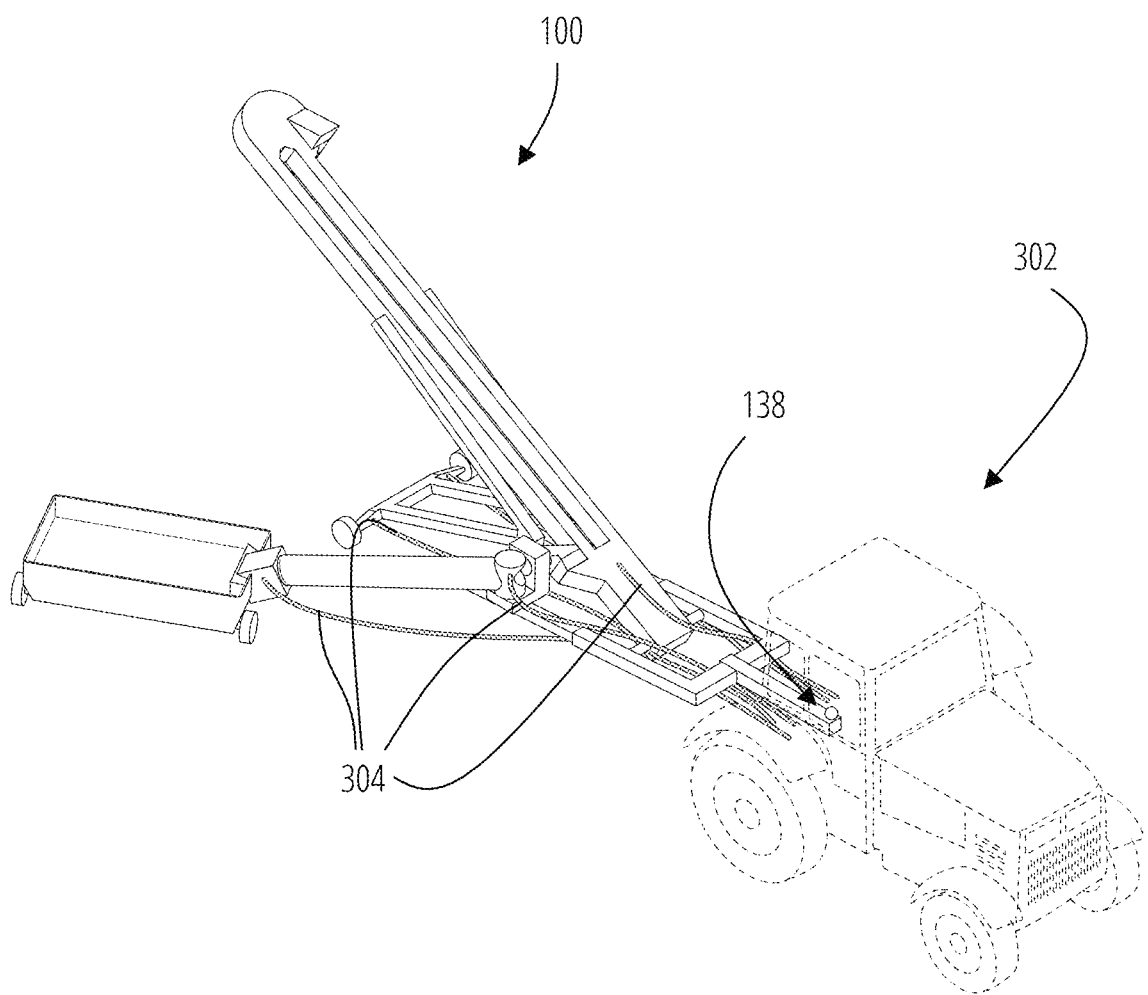

FIG. 3 illustrates a perspective view of the deployable bulk material distribution apparatus in the transportable configuration of FIG. 2B, attached to a vehicle and ready to be transported, in accordance with one embodiment.

DETAILED DESCRIPTION

The details of one or more embodiments of the subject matter of this specification are set forth in the accompanying drawings and the description below. Other features, aspects, and advantages of the subject matter will become apparent from the description, the drawings, and the claims.

Like reference numbers and designations in the various drawings indicate like elements.

The disclosure shows examples of a deployable bulk material distribution apparatus that may be transported and deployed at a given discharge locations so as to distribute and discharge an amount of a flowable bulk material into one or more storage containers or to a storage location or structure.

FIG. 1 shows an exemplary embodiment of a deployable bulk material distribution apparatus, referred generally using the numeral 100, for discharging from a designated height an amount of a flowable bulk material into a discharge location. The flowable bulk material may generally include any kind of flowable bulk material, including liquid materials and/or materials comprising a plurality of small discrete elements such as particulate/granular materials (seeds, grains, gravel, sand, etc.). However, as an example only, below the apparatus 100 will be discussed in the context of distributing grain or the like. Thus, in this example, the apparatus 100 may be used to discharge grain into one or more discharge locations. These may include bins or containers, or even simply a designated location on the ground, where an amount of the grain is to be discharged therein/thereto. The apparatus 100 is configured to easily moved and deployed at a plurality of discharge locations, thus saving time and money.

As shown in FIG. 1, in some embodiments, the apparatus 100 comprises a mobile container 102 comprising wheel 104 thereon, the container 102 being configured to receive the amount of flowable bulk material (e.g., grain) therein, for example from a truck or another vehicle or machine. A side of the container 102 is rotatably coupled an auger section 106 via an input aperture 108. The input aperture 108 is configured so that the grain in the container 102 may be readily fed to the auger section 106.

The operating principle of an auger is generally known in the art. Thus, the auger section 106 generally comprises an elongated casing comprising therein an helicoidal shaft (not shown) configured to move the grain upwards from the input aperture 108 upon the helicoidal shaft being rotated via a hydraulic drive or electric motor. The grain is moved through the auger section 106 to a joint assembly 110 comprising a first rotatable joint 112, a coupling member 114 and a second rotatable joint 116. The first rotatable joint 112 is rotatably coupled to a side of the L-shaped coupling member 114 so as to be movable with respect to a vertical rotation axis 118 centered on the first rotatable joint 112. This allows the container 102 to be moved horizontally along the dashed arrows shown in FIG. 1 without being disconnected or uncoupled from the coupling member 114.

The coupling member 114 is rotatably coupled to a second rotatable joint 116, which itself is coupled to the boot inlet 120 of a bucket elevator section 122. As will be discussed further below, the bucket elevator section 122 is configured so as to be movable/deployable between an upright position (shown in FIG. 1), which is used for lifting at the designated height the grain received in the boot inlet 120 via the auger section 106 and discharging the grain at the designated discharge location; and a reclined position wherein the bucket elevator section 122 is substantially reclined for transport to another discharge location (to be discussed below). Two hinge rods 124 are affixed on or extend from opposite sides at the bottom of the bucket elevator section 122 and are each rotatably coupled at one end to different sides of a displaceable support frame 126.

In some embodiments, the output chute 128 may be coupled to a diverter 130 operable to split the grain coming out of the output chute 128 into three different streams 132 of grain.

The operating principle of a bucket elevator or the like is generally known in the art, and thus the interior of the bucket elevator section 122 is not shown. Typically, it comprises a housing having therein two pulleys attached to a belt and drive, with a plurality of buckets or bins affixed to the belt. Upon being actuated by the pulleys, a side of the belt moves upwards with the buckets filled with grain from the boot inlet 120, where they are discharged via the output chute 128. In this example here, the head pulley is located at the top-most end of the bucket elevator section 122 while a bottom or boot pulley is typically located at the bottom end thereof. In this exemplary embodiment, the casing of the bucket elevator section 122 is shown to be divided into two parallel channels, one channel opposite side of the output chute 128 for moving the grain upwards and the other, adjacent to output chute 128, for moving the emptied buckets/containers downward. However, it will be readily appreciated by the skilled person in the art that different configurations of the bucket elevator section 122 may be used.

In the upright position, the bucket elevator section 122 is held in place via at least one retractable/collapsible/foldable support member 134, the operation of which will be discussed below. The support member 134 is coupled at one end to the displaceable support frame 126, here shown as inclined support frame comprising two wheels 136 at one end thereof and an attachment means at the other end, for example a hitch ball mount 138 or the like. The displaceable support frame 126 may be removably attached to a motorized vehicle (e.g., truck, tractor, etc.) via the attachment means to transport the apparatus 100 when the bucket elevator section 122 is in the reclined position.

In some embodiments, the length of the displaceable support frame 126 is adjustable by having a first portion 140 thereof configured to slidingly receive therein a second portion 142 thereof, thus allowing the second portion 142 to be slidingly moved so as to adjust the length of the support frame 126 as shown by the arrows.

In some embodiments, the apparatus 100 is configured so as to be compact so as to be usable in tight spaces, for example only requiring around 40 feet from the discharge location to a truck or other vehicle providing the grain to the container 102. This is in contrast with a conventional grain auger which would require a hundred feet or more.

FIGS. 2A and 2B illustrate how the bucket elevator section 122 of the apparatus 100 may be moved from the upright position (FIG. 2A) into the reclined position (FIG. 2B).

In the illustrated embodiment, the support member 134 is shown comprising two parallel, vertically extended members linked together via a horizontal section in the middle, herein referred to as the middle portion 202. This configuration ensures that the uppermost portion of the bucket elevator section 122 is held in place from two opposite sides, thus improving the stability in the upright position. The middle portion 202 divides the support member 134 as a whole into a top portion 204 and a bottom portion 206.

The uppermost first end 208 of the support member 134 is coupled to the bucket elevator section 122, while the second end 210 of the support member 134 is rotatably coupled to the displaceable support frame 126 along a first rotation axis 212. The middle portion 202 of the support member 134 is configured to hingedly couple together the top portion 204 and the bottom portion 206 of the support member 134, so that they are jointly pivotally movable with respect to a second rotation axis 214 located at the middle portion 202.

As shown in FIG. 2A, when the support member 134 is folded/collapsed, the bottom portion 206 and the top portion 204 of the bucket elevator section 122 are moved up and down, respectively, as shown by the dashed arrows.

FIG. 2B shows the bucket elevator section 122 in the reclined position, with the dotted arrow showing the change in orientation of the bucket elevator section 122 with respect to a third rotation axis 216 centered on hinge rods 124 rotatably coupled to the displaceable support frame 126.

To move the bucket elevator section 122 in the recline position, the support member 134 is collapsed so that the bottom portion 206 is pivoted downwards with respect to the first rotation axis 212, so as to fold the top portion 204 over the bottom portion 206 with respect to the second rotation axis 214 of the middle portion 202. To move back the bucket elevator section 122 to the upright position, the support member 134 is unfolded by pivoting the bottom portion 206 upwards again with respect to the first rotation axis 212, the top portion 204 being pivoted until the top portion 204 and the bottom portion 206 are substantially aligned along a common straight line. In each case, the bucket elevator section pivots via the hinge rods 124.

The rotatable coupling of the input aperture 108, the first rotatable joint 112 and of the second rotatable joint 116 allows the auger section 106 and container 102 to freely move along the bucket elevator section 122 when the latter is moved between the upright position and reclined position. In some embodiments, the input aperture 108 may be rotatably coupled to the side of the container 102 via a ball joint or similar, that allows the auger section 106 to freely pivot around the input aperture 108 via any axes of rotation. This ensures that, as illustrated in FIG. 2B, the auger section is able to move without torsional stress being applied thereto, and that the container 102 is not overturned when moving the bucket elevator section 122 between the upright position and reclined position.

In addition, the skilled person in the art will appreciate that, in some embodiments, the support member 134 may include different numbers of elements/parts, coupled to each other via different configurations, as long as they are generally configured to move the bucket elevator section 122 from the reclined position to the upright position, and further being operation to hold, at least in part, the uppermost portion of the bucket elevator section 122 in the upright position.

FIG. 3 shows the apparatus 100 with the bucket elevator section 122 in the reclined position with the displaceable support frame 126 being removably attached to a tractor 302 and coupled electrically/hydraulically thereto via electrical and/or hydraulic lines 304. Thus, the apparatus 100 may be moved to a discharge location and be deployed using the lines 304 coupled to an electrical/hydraulic drive assembly.

In some embodiments, both the auger section 106 and the bottom pulley (not shown) of the bucket elevator section 122 may be mechanically/hydraulically coupled to a same hydraulic drive assembly and transmission system. This allows the auger section 106 and the bucket elevator section 122 to be powered and operated via the same hydraulic drive assembly, thus eliminating the need of a separate drive assembly at top of the bucket elevator section 122.

In some embodiments, the hydraulic drive assembly may be controlled via a control panel or interface (not shown), for deploying or reclining the bucket elevator section 122 as required.

The foregoing descriptions of specific embodiments of the present invention have been presented for purposes of illustration and description. They are not intended to be exhaustive or to limit the invention and method of use to the precise forms disclosed. Obviously, many modifications and variations are possible in light of the above teaching. As can be understood, the examples described above are intended to be exemplary only.

The embodiments described were chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient but is intended to cover the application or implementation without departing from the spirit or scope of the claims of the present invention.

The term "connected", "attached", "affixed" or "coupled to" may include both direct coupling (in which two elements that are coupled to each other contact each other) and indirect coupling (in which at least one additional element is located between the two elements).

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A deployable bulk material distribution apparatus for discharging from a designated height an amount of a flowable bulk material into a discharge location, the apparatus comprising:
  a mobile container comprising two or more wheels and configured to receive the amount of flowable bulk material to be discharged therein;
  an auger section comprising an input aperture rotatably coupled to a side of the mobile container, the auger section being operable to move the flowable bulk material from the container to an exit aperture thereof;
  a bucket elevator section, the bucket elevator section being hingedly coupled to a displaceable support frame, and being configured so as to be pivotally movable between:
    an upright position for lifting at the designated height the flowable bulk material received from the exit aperture of the auger section via a boot inlet of the bucket elevator section and discharging the flowable bulk material at the discharge location from a discharge outlet thereof; and
    a reclined position wherein the bucket elevator section is substantially reclined for transport; and a joint assembly coupling the exit aperture of the auger section to the boot inlet of the bucket elevator section so as to allow the flowable bulk material to move from the exit aperture to the boot inlet when the bucket elevator section is in the upright position, the joint assembly being rotatably coupled to both the boot inlet of the bucket elevator section and the exit aperture of the auger section, wherein the input aperture and joint assembly are each operable to rotate so that the auger section and the container move freely along the bucket elevator section when the bucket elevator section is moved between the upright and reclined position without torsional stress being applied to the auger section and without the container being overturned;

wherein the displaceable support frame comprises:

at least two wheels;

at least one retractable or foldable rigid support member coupled to the support frame at one end and an upper portion of the bucket elevator section at the other, the support member being operable to hold and move the bucket elevator section between the upright position and the reclined position; and an attachment means to removably attach the displaceable support frame to a motorized vehicle for transporting the apparatus when the bucket elevator section is in the reclined position to said discharge location.

2. The apparatus of claim 1, wherein the bucket elevator section is pivotally coupled to the displaceable frame via one or more hinge rods.

3. The apparatus of claim 2, where the joint assembly comprises:

a coupling member, the coupling member being substantially L-shaped and comprising therein two joint apertures;

a first joint configured to mechanically couple together the exit aperture of the auger section and one of said two joint apertures of the coupling member, the first joint being rotatably coupled to the coupling member so as to be rotatable with respect to a vertical axis of rotation centered thereon; and a second joint coupled at one end to the input shoot of the bucket elevator section and rotatably coupled at a second end to the coupling member, the second end configured to be rotatable with respect to the coupling member along the horizontal axis of rotation centered thereon.

4. The apparatus of claim 3, wherein said input aperture of the auger section is rotatably coupled to the side of the container via a ball joint allowing the auger section to pivot freely with respect to the input aperture along any axis of rotation.

5. The apparatus of claim 1, further comprising a hydraulic drive coupled to both the auger section and the bucket elevator section and operable to drive the auger section and bucket elevator section simultaneously.

6. The apparatus of claim 5, wherein the hydraulic drive is coupled to a bottom pulley of the bucket elevator section.

7. The apparatus of claim 1, wherein the at least one retractable or collapsible support member comprises a middle portion configured to hingedly couple a top portion and bottom portion of the support member, the top portion of the at least one retractable or collapsible support member being affixed to the bucket elevator section;

the bottom portion of the at least one retractable or collapsible support member having an end thereof rotatably coupled the displaceable support frame; and wherein the bucket elevator section is moved from the upright position to the reclined position or from the reclined position to the upright position by pivotally moving the bottom portion downwards or upwards, respectfully, with respect to the displaceable support frame, thereby folding or unfolding the top portion with respect to the bottom portion.

8. The apparatus of claim 1, wherein an output chute of the bucket elevator section has coupled thereto a diverter operable to divide the flowable bulk material being discharged into two or more streams simultaneously.

9. The apparatus of claim 1, wherein the distance between the container and discharge location is 40 feet in length or less.

* * * * *